March 17, 1970 F. BUCHSBAUM 3,501,182
GEAR HUB CLAMP
Filed July 12, 1968

FRANK BUCHSBAUM
INVENTOR.
BY Leonard H. King
ATTORNEY

United States Patent Office 3,501,182
Patented Mar. 17, 1970

3,501,182
GEAR HUB CLAMP
Frank Buchsbaum, 75—04 195th St.,
Flushing, N.Y. 11366
Filed July 12, 1968, Ser. No. 744,567
Int. Cl. F16d 1/06; F16b 17/00; F16c 3/00
U.S. Cl. 287—52.04                                      9 Claims

ABSTRACT OF THE DISCLOSURE

A sleeve, having a deflectable tab is inserted in the bore of a gear hub and is brought into gripping engagement with the gear shaft by means of a set screw extending through the gear hub.

This invention relates generally to miniature, precision gears and in particular to improved means for securing a gear hub to a shaft for rotation therewith.

BACKGROUND OF THE INVENTION

Miniature, precision gears, for example the gears and the gear assemblies that are used in mechanical computers, present several assembly problems not found in the larger, more conventional gears. As the name implies there is usually very little material to work with, the space available for mounting and adjustment is usually very limited and yet, because of the critical nature of the application, the gears must be very accurately positioned without likelihood of movement after the proper angular or axial adjustment has been made. Some attempts to solve the mounting problem of miniature precision gears have resulted in the use of drive or locking pins to fasten the gear hub to its shaft and in the use of clamp members to deflect a slotted gear hub into frictional engagement with its shafts. There are sufficient disadvantages to both these prior art structures to encourage those working in the art to seek more practical solutions.

One novel approach to the construction of clampable, precision gears is described in U.S. Patent No. 3,139,296, issued on June 30, 1964 to Sanford I. Greene. This patent describes a gear, clampable on a supporting shaft in any desired angular position, as comprising a gear body and a cylindrical collar integral therewith, a continuous bore extending through the body and the collar, two longitudinally spaced transverse radial slots through a substantial portion of the collar, one slot adjacent the gear body, a longitudinal slot through at least one portion of the collar and lying in a plane substantially axial thereof, the longitudinal slot extending between and intersecting the radial slots, and a clamping screw passing through a portion of the collar on one side of the longitudinal slot and threaded into a portion of the collar on the opposite sides of the longitudinal slot.

The structure described above and in the aforementioned patent is well suited to minature, precision gears. However, it does exhibit several very important disadvantages that limit its practicality. For example, the longitudinal slot cannot readily be made by ordinary machining techniques. The longitudinal slot must be made by electrical discharge machining or other similarly advanced means and therefore requires highly skilled labor as well as relatively costly equipment. As a result of the machining, and particularly at the close tolerances that are mandatory in this art, the slots will necessarily have burrs protruding into the inside diameter of the hub and these can be removed only by costly and slow hand deburring.

It is also important to note that, in the aforementioned patent, the slots define flexible tabs and that the line of action of the screw with respect to the tabs is such that the tightening of the screw causes a change of curvature of the tabs. This in turn causes bending stresses that resist turning of the screw. Further, because of the very small sizes involved, a compromise must be made as to the flexibility of the tabs and the size of the screw. Even with the best balance possible of these two factors the screws that are generally used are fine threaded and can easily be stripped by using excessive force.

Another example of the prior art that is not described in the patent literature but which is presently available commercially provides a hub or collar that may be applied to a gear and which includes an axially extending, arcuate cut. The arcuate cut extends partially about the bore of the collar and a substantially radial cut extends from the bore and terminates at the arcuate cut to define a flexible, integral tab. A set screw extending radially into the hub bears against the tab to deflect it inwardly into gripping engagement with the shaft positioned in the bore.

As with the patented structure that was described previously, the arcuate slot is difficult and expensive to make and must be done by non-conventional means such as electrical discharge means or the like. It is apparent that if cutting saws are used they would have to have very small diameters or, alternatively, the quantity of material removed relative to the hub diameter would have to be large. Of even greater importance is the fact that the machining of the slot causes an out-of-roundness of the bore. Therefore the concentricity of the gear teeth with respect to the shaft mounted in the bore would not meet precision gear standards.

U.S. Patents Nos. 2,827,316 and 2,986,416 are also pertinent to a discussion of prior art in that they both disclose separate, internal members that act to secure a hub to a shaft. Patent No. 2,827,316, issued on Mar. 18, 1958 to William W. Duffy, discloses an arcuate, insert member having a length of approximately 60 degrees. One end of the arcuate member has a circular rib that fits in a similarly shaped recess in the hub while the opposite end has a radial extension that can be inwardly deflected by a set screw so that the central portion of the insert member can bear against and retain a shaft. This structure does not provide full circumferential clamping and in addition is costly because of the complex shape of the insert and the recess in the hub to contain the insert. In addition, means must be provided to prevent axial movement of the insert. Therefore, its utility in miniature precision gearing is severely limited.

U.S Patent No. 2,986,416, granted on May 30, 1961 to David Firth teaches the use of an annular, wedge-like bushing that acts like a taper lock when a force is applied by axially located set screws. The size of the structure plus the axial positioning and action of the set screws makes the device totally inapplicable to miniature, precision gearing installations.

In contrast to the prior art the present invention provides clamping means that are particularly well suited to miniature precision gears and which can be manufactured with conventional machinery. The present invention is comprised of a gear having an integral hub that includes a bore concentric with the pitch diameter of the gear. A bushing is press fit into the bore and is secured therein. The bushing has two slots machined therein by conventional techniques, one slot being parallel and one slot being perpendicular to the longitudinal axis of the bushing. The slots, in combination, define an integral, deflectable tab that frictionally secures the bushing to the shaft when a set screw is threaded through the hub and against the tab. An annular groove formed on the inside diameter can be added to remove any burrs formed by the cutting of the slots. Further the hub can be counterbored and the bushing made somewhat shorter than the hub to assure concentricity between the gear pitch diameter and the longitudinal axis of the shaft.

While the subsequent description will relate to the mounting means for a miniature precision gear it should be clearly understood that the scope of the present invention includes any shaft mounted wheel such as gears, pulleys, sprockets, ratchets, rollers, cams etc. and that the term "wheel" is used in its generic sense.

Accordingly it is a primary object of this invention to provide improved means for securing a shaft mounted wheel.

A particular object of this invention is to provide improved means for securing a shaft mounted wheel in the miniature, precision class.

Another object of this invention is to provide a bushing having an integral, deflectable tab for securing a gear hub to a shaft.

An additional object of this invention is to provide a bushing, as described directly above, that can be fabricated by conventional techniques.

These and other features, objects and advantages of the invention will, in part, be pointed out with particularity and will, in part, become obvious from the following, more detailed description of the invention, taken in conjunction with the accompanying drawing, which forms an integral part thereof.

In the various figures of the drawing, like reference characters designate like parts.

Figure 1:
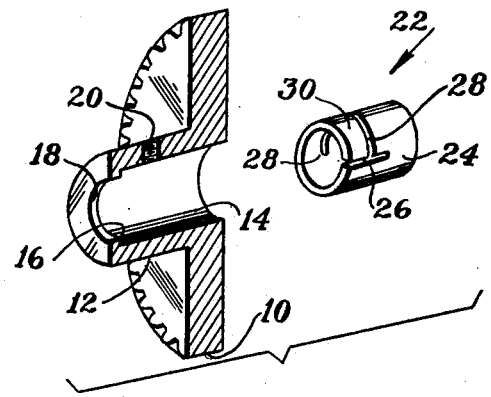
FIG. 1 is an exploded, perspective view, partly in section, illustrating the gear, the hub and bushing of this invention.
Figure 2:
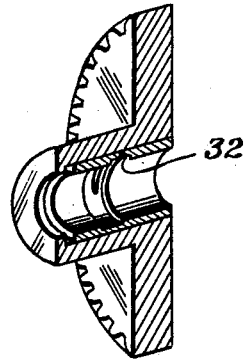
FIG. 2 is a sectional, elevational view illustrating the members shown in FIG. 1 in the assembled condition.

The present invention, as shown in FIG. 1 and FIG. 2, comprises a gear 10 having an integral and longitudinally extending hub 12. A longitudinal bore 14 is provided in the hub 12 and includes a shoulder 16 extending radially inward at the end of the hub 12 opposite the gear 10. The shoulder 16 defines an accurately located and machined bore 18 that permits the gear teeth to be generated concentrically thereto. Finally, the hub 12 is provided with at least one tapped hole 20 that extends radially through the wall of the hub.

FIGS. 1 and 2 also illustrate the bushing 22 that comprises this invention. The bushing 22 is tubular, the wall portion 24 thereof having a first slot 26 that is parallel to the longitudinal axis of the bushing and a second slot 28 that is perpendicular or transverse to the longitudinal axis of the bushing 22. It will be seen, particularly in FIG. 1, that the bushing slots 26 and 28 intersect to define a tab 30 that will be flexible to a degree dependent upon the composition of the bushing material and the thickness of the wall portion 24. Finally, the inside diameter of the bushing 22 may, if desired, be provided with an annular groove 32 that spans the slot 28 to remove any transverse burrs that may have been formed during the machining of the transverse slot 28. The annular groove 32 may be formed after the bushing 22 has been press fit into the bore 14 of the gear 10 and the hub 12.

Figure 3:
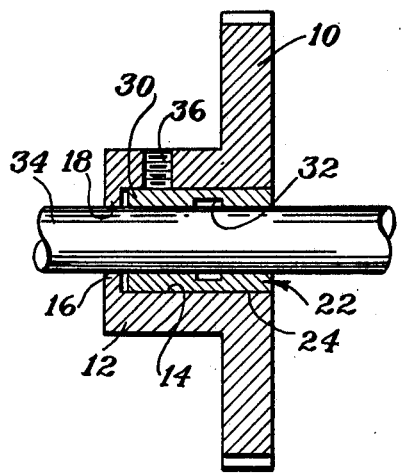
FIG. 3 is a sectional, elevational view similar to FIG. 2 but showing a shaft and a set screw securing the hub and the bushing to the shaft.

FIG. 3 illustrates one form of the present invention in the assembled condition. A shaft 34 is inserted into the inside diameter of the bushing 22 and is secured thereto by means of a set screw 36. When the set screw 36 is tightened or moved radially inward it will cause the flexible tab 30 to clamp the hub 12 against the shaft 34. As is apparent, the gear 10 and hub 12 can be axially located anywhere on the shaft 34 and can also be set at any desired angular position. It should also be noted that the bushing 22 is axially shorter than the bore 14 and is slightly spaced from the shoulder 16. This is to provide solid support in the area of the tab 30. Further, the shaft 34 is mounted concentrically with the gear 10 by means of shoulder 16 and bore 18 and is also supported by the solid or uncut part of the body portion 24 of the bushing 22. The finishing cut 32, to remove burrs, can be done after the bushing 22 is press fit in a properly oriented manner in the hub 12.

Figure 4:
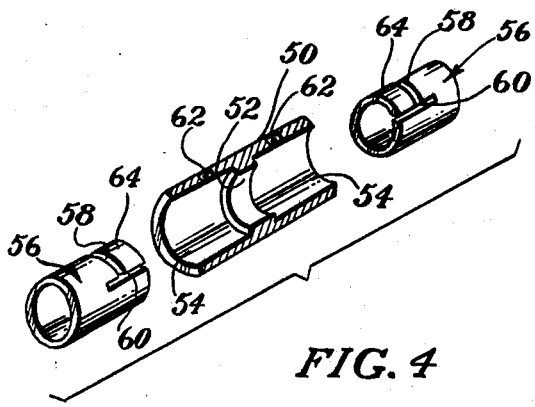
FIG. 4 is an exploded, perspective view partly in section of an alternative embodiment of this invention.

As mentioned previously, the scope of the present invention includes a wide range of shaft mounted wheels. As shown in FIG. 4 it will also be seen that the basic concept of this invention can be used as a coupling for two coaxial, in-line shafts in miniature, precision applications. This can be done by providing a double ended hub 50. If desired a smaller, central bore 52 may also be provided to receive and align the ends of opposed shafts (not shown). Bores 54 of the hub 50 are dimensioned to receive tubular bushings 56 as in the previous embodiment. The end of each bushing 56 is formed with a first transverse slot 58 and a second intersecting, axially positioned slot 60. Tapped holes 62 in the hub wall are adapted to receive set screws to bear against the tabs 64 defined by the respective pairs of slot 58 and 60. Of course the axial length of the hub 50 would be appropriately dimensioned to receive the two bushings and the "wheel" portion (gear 10) of the previous embodiment would be eliminated.

The present invention has several distinct advantages over the prior art. Since the set screw 36 is not part of the tab 30, then for the same clamping force, a narrower hub 12 can be made. Conversely for the same hub size, a larger screw can be used to provide a greater clamping force. Because the set screw 36 is subjected only to compressive loads it does not have any binding stresses. Further, the set screw 36 acts in the direction of clamping and its full force is utilized to achieve the largest possible mechanical advantage. Standard, hardened set screws, whose size is not limited, can be used thus avoiding the need for specialized and costly hardware. It follows of course that the larger the set screw the larger is the clamping force.

As regards machining of this invention, only conventional, readily available apparatus requiring standard skills is needed. The hub 12 and the bushing 22 can be machined after they are assembled so that high degrees of precision can be met. The internal groove 32, to eliminate burrs, may be machined after assembly. The machining of the tapped holes 20 for the set screw 36 is done radially thereby obviating any need for counterboring or milling prior to the formation of the tapped hole 20.

Substantially the entire length of the hub 12 is solid and machined to a close tolerance thus assuring intimate contact between the shaft 34 and the inside diameter of the bushing 22. This eliminates any possibility of "wobble." The size and concentricity of bore 18 in shoulder 16 of hub 12 is closely controlled thus assuring concentricity of the pitch diameter of gear 10 with respect to the longitudinal axis of the shaft 34. After assembly of the bushing 22 into the hub 12, there is substantially a unitary structure and little possibility that the relative positions of the parts will change prior to usage.

As an alternative method of manufacture the radial and transverse slits can be formed in a solid slug which is then pressed into a hub which has the shoulder and the tapped hole. After the press-fit the hole is bored to size. This boring includes the slug as well as the shoulder. The tab is thus formed by virtue of the existence of the cuts. The gear is then hobbed with respect to this uniform bore in a subsequent operation.

Having thus disclosed the best embodiment of the invention presently contemplated, it is to be understood that various changes and modifications may be made by those skilled in the art without departing from the spirit of the invention.

What I claim as new and desire to secure by Letters Patent is:

1. Improved clamping means suitable for mounting a miniature, precision component on a rotatable shaft comprising:
   (a) an elongated, tubular hub having a bore therethrough;
   (b) at least one tubular bushing positioned in said bore of said hub, said bushing including a flexible tab integral with the wall thereof and defined by a first, transverse slot in the wall of said bushing and a second slot in the wall of said bushing parallel to the axis of said bushing and intersecting said first slot;
   (c) an annular groove formed on the inner surface of said bushing, said annular groove being coincidental with said first transverse slot; and
   (d) a screw rotatably disposed in the wall of said hub and positioned to bear against and inwardly deflect the outside surface of said tab whereby the inside surface of said tab is in clamping engagement with the shaft extending into said bushing.

2. The clamping means in accordance with claim 1, wherein said precision component is a gear integral with said hub, the pitch diameter of said gear being concentric about the axis of said hub.

3. The clamping means in accordance with claim 1 wherein the bore of said hub includes a radially inward directed shoulder and a second bore through said shoulder, the second bore being concentric with the axis of said hub to support the shaft and not larger than the inside diameter of said bushing.

4. The clamping means in accordance with claim 3 wherein said shoulder is positioned at one end of said hub and, in the assembled condition, one end of said bushing is axially adjacent said shoulder.

5. The clamping means in accordance with claim 1 wherein said first, transverse slot extends over an arc ranging between 90° and 180°.

6. The clamping means in accordance with claim 1 including two of said bushings, each of said bushings including a flexible tab, said bushings being coaxially positioned end-to-end in said hub and a pair of screws threadably disposed in the wall of said hub and positioned to bear against said tabs.

7. The clamping means in accordance with claim 6 wherein said hub includes a radially inward directed shoulder and a second bore through said shoulder, said second bore being not greater than the inside diameter of said bushings, said shoulder being centrally located on the axis of said hub, said bushings being positioned on opposite sides of said shoulder.

8. The clamping means in accordance with claim 6 including an annular groove formed on the inner surface of each said bushing, each said annular groove being coincidental with said respective first, transverse slot.

9. The clamping means in accordance with claim 6 wherein said first, transverse slot extends over an arc ranging between 90° and 180°.

References Cited

UNITED STATES PATENTS

| | | | |
|---|---|---|---|
| 106,756 | 8/1870 | Whitmore | 287—52.08 |
| 286,340 | 10/1883 | Spaulding | 287—52.09 |
| 771,951 | 10/1904 | Wahlstrom | 287—114 |
| 2,401,351 | 6/1946 | Herbst et al. | 287—53 |
| 2,564,019 | 8/1951 | Martin | 287—110 |
| 2,754,716 | 7/1956 | Bourns | 85—8.3 |
| 2,938,698 | 5/1960 | Johnson | 279—83 XR |
| 3,107,523 | 10/1963 | Oliver et al. | 279—44 XR |

FOREIGN PATENTS

| | | |
|---|---|---|
| 7,943 | 1/1906 | Great Britain. |
| 173,416 | 1/1922 | Great Britain. |

DAVID J. WILLIAMOWSKY, Primary Examiner

ANDREW V. KUNDRAT, Assistant Examiner

U.S. Cl. X.R.

287—111